United States Patent Office 3,784,601
Patented Jan. 8, 1974

3,784,601
PROCESS FOR THE PRODUCTION OF MOLDED ARTICLES OR COATINGS FROM POLYADDUCTS BY REACTION OF POLYETHERS WITH POLYISOCYANATES
Karl Jellinek, Letmathe, Udo Post, Wibmar uber Gieben, and Rudi Oellig, Duisburg-Meiderich, Germany, assignors to Rutgerswerke Aktiengesellschaft, Frankfurt, West Germany
No Drawing. Filed Feb. 17, 1972, Ser. No. 227,256
Claims priority, application Germany, Feb. 17, 1971, P 21 07 441.9
Int. Cl. C08g 22/10, 22/14
U.S. Cl. 260—77.5 AP       8 Claims

ABSTRACT OF THE DISCLOSURE

Process for preparing a composition of matter suitable for the production of molded articles or coatings, said process comprising preparing a polyether by reacting an unsubstituted, halogen-substituted or alkyl substituted hexahydrophthalic acid diglycidyl ester with a cycloaliphatic diol in a molar ratio of 1:0.8 to 0.8:1, and mixing the resulting polyether with a polyisocyanate.

---

This invention relates to the use of polyethers, which carry hydroxyl groups and have a cycloaliphatic base structure, for the production of molded articles or coatings.

Aromatic polyethers containing hydroxyl groups are known in the art. They can be produced, for example, by condensation of bivalent phenols with diepoxy compounds in a molar ratio of about 1:1 with the aid of a catalyst. Solid products with variable molecular weights are obtained. The polyethers have a linear structure, and carry hydroxyl groups in the chain and at the ends of the chain.

In practice, the diglycidylether of bisphenol A and 4,4'-dihydroxydiphenyl methane have been found to be particularly suitable as the phenolic component of the condensation reaction. The resulting high molecular weight polyethers are particularly suitable as binders in varnishes and adhesive compositions. The polyethers are surprisingly resistant to chemical attack by acids, caustics, and organic solvents. Also, they exhibit a high degree of adhesion to almost all metallic, inorganic and organic substances. Thus, these aromatic polyethers have been found to be important components in the production of protective coatings for surfaces where corrosion resistance is important.

Aromatic polyethers are generally dissolved in suitable solvents. By cross-linking the polyethers with polyisocyanates, varnishes are obtained which can be used under hot or cold conditions.

The known polyethers prepared from aromatic polyphenols have not proven entirely satisfactory when exposed to ultraviolet light and weathering. Coatings prepared from these polyethers yellow after a short period of time outdoors. Furthermore, when fillers or pigments are added to these coatings, chalking becomes noticeable, which at first makes the surface film appear unattractive, then finally destroys it. The accumulation of aromatic structural elements existing in the binder is considered to be the reason for this behavior.

It now has been found that the disadvantages mentioned above can be substantially overcome without appreciably affecting the previously mentioned advantages associated with the use of the aromatic polyethers containing hydroxyl groups. This is accomplished by using polyethers, which consist largely of cycloaliphatic structural elements, and which contain certain selected hydroxyl groups.

Accordingly, this invention provides a process for preparing a composition of matter suitable for the production of molded articles or coatings said process comprising preparing a polyether by reacting an unsubstituted, halogen-substituted or alkyl substituted hexahydrophthalic acid diglycidyl ester with a cycloaliphatic diol in a molar ratio of 1:0.8 to 0.8:1, and mixing the resulting polyether with a polyisocyanate.

The polyethers employed in practicing this invention have the following general structural formula:

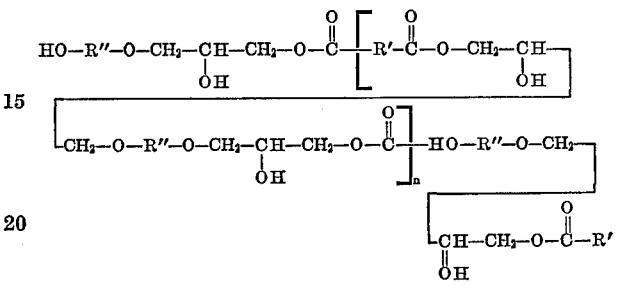

in which

R'=unsubstituted, halogen-substituted or alkyl substituted cyclohexylene ring,
R"=for example, cyclohexylene, tricyclodecanedimethylene or cyclohexanedimethylene and
n=an interger from about 10 to about 40.

The following examples describing production and use will give the expert in the art a more detailed understanding. All ratios, parts, proportions and percentages are by weight unless otherwise indicated.

EXAMPLE 1

Solvent containing varnish (production of a coating)

(a) Production of a polyether:

Raw materials:                                                G.
  Hexahydrophthalic acid diglycidyl ester (1 mole) _____ 286
  4,4'-dihydroxydicyclohexylpropane (1 mole) _____ 240

The hexahydrophthalic acid diglycidyl ester (1 mole) is heated to 100° C. in a flask, which is equipped with an agitator and thermometer, and the dihydroxydicyclohexylpropane is added in several increments. The resulting mixture is heated to 160° C., and is reacted at this temperature until the presence of epoxy groups is no longer detectable. The resin prepared in this manner has the following characteristics:

Softening range _____° C__ 95–100
Content of hydroxyl groups _____percent__    5

(b) Composition and production of a two-component varnish:

Component A:                                                  G.
  (1) Polyether described under (a) dissolved in cyclohexanone to obtain a solution having a 40% solids content _____ 52.9
  (2) Titanium white RN 57 _____ 14.2
  (3) Blanc fixe N _____ 7.1
  (4) Microtalc AT extra _____ 7.1
                                                            81.3

Component B:
  (5) Tris-(isocyanatohexamethylene)-biuret _ 18.7
                                                            100.0

Components (1) through (4) are dispersed in a ball mill to obtain a particle size below 10μ.

After mixing components A and B in a weight ratio of 81.3:18.7, a varnish is obtained having the following characteristics:

| | |
|---|---|
| Pigment/binder ratio | 1:1.24 |
| Fillers on a solids basis _____percent__ | 44.7 |
| Viscosity DIN 4/20 _____sec__ | 57.0 |
| PVK _____percent__ | 20 |

This varnish when applied to a metal substrate with a brush or spray gun, will result in a film having the following characteristics.

(c) Characteristics of the varnish film:

| | |
|---|---|
| Drying time | T1 after 6 hours; T7 after 20 hours. |
| Thickness of the film | 50μ. |
| Pändelharte after 30 d RT | 145 sec. |
| Erichsen depression | 4–5. |
| Yellowing (Xeno test method), 700 hours | No noticeable change. |
| Chalking resistance, DIN 53159, 1 year (evaluation according to the chalking scale of the Titanium Company) | Stage 10. |
| Reduction in gloss after 12-months storage in an industrial atmosphere (gloss meter according to Lange, measuring angle 45°) | Drop from 98 to 92%. |
| Resistance to chemicals (3-months storage in HCl 10%, NH$_4$OH 10%, distilled water) | No change. |

EXAMPLE 2

Solvent containing varnish (a) Raw materials:

| | G. |
|---|---|
| Hexahydrophthalic acid diglycidyl ester (1 mole) | 286 |
| Tricyclodecanedimethylol (TCD alcohol) (1 mole) | 196 |

The resin is produced under the same conditions as stated in Example 1(a).

The resin prepared in this manner has the following characteristics:

| | |
|---|---|
| Softening range _____° C__ | 80–85 |
| Content of hydroxyl groups _____percent__ | 6 |

(b) Production and characteristics of the varnish:

| | G. |
|---|---|
| (1) Polyether described under (a) | 27.1 |
| (2) Cyclohexanone/methylisobutyl ketone, 1:1 | 19.2 |
| (3) Titanium white RN 57 | 14.9 |
| (4) Blanc fixe N | 7.4 |
| (5) Microtalc AT extra | 7.4 |
| (6) Tris-(isocyanatohexamethylene)-biuret | 24.0 |

Components (1) through (5) are dispersed in a ball mill to obtain a particle size below 10μ. After adding and mixing in component (6), a varnish with the following characteristics is obtained:

| | |
|---|---|
| Pigment/binder ratio | 1:1.52 |
| Fillers on a solids basis _____percent__ | 39.7 |
| Pot life _____hours__ | >8 |
| PVK _____percent__ | 15 |

(c) Characteristics of the film of varnish: After application to a metal substance by means of a spray gun or by painting with a brush, a film having the following characteristics is obtained:

| | |
|---|---|
| Drying time | T1 after 2.5 hours; T7 after 25.0 hours. |
| Film thickness | 50μ. |
| Pendelhärte after 30 d RT | 156. |
| Erichsen depression | 4–5 mm. |
| Yellowing (Xeno test method), 750 hours | No noticeable change. |
| Chalking resistance, DIN 53159, 1 year (evaluation according to the chalking scale of the Titanium Company) | Stage 10. |
| Reduction of gloss after 6-months storage in an industrial atmosphere (gloss meter according to Lange, measuring angle 45°) | Drop from 92 to 89%. |

In order to make clear the difference between coating masses on cycloaliphatic base according to this invention and those on common aromatic base the results of the technical test for varnishes of a system consisting of a bisphenol resin (phenoxy-resin) with a softening range from 95–100°, an epoxy equivalent from 900–1000 and a hydroxy group portion of 6 percent are given below. The recipe for the varnish is the same as written in Example 2.

| | |
|---|---|
| Pot time | 7 h. |
| Film thickness | 50μ. |
| Drying time | T1 after 3 hours; T7 after 16 hours. |
| Pendelhärte after 20 d RT | 95 seconds. |
| Erichsen depression | 6–7 mm. |
| Yellowing (Xeno test method), 500 hours | Noticeable change. |
| Chalking resistance, DIN 53159 (evaluation according to the chalking scale of the Titanium Company) | Stage 8. |
| Reduction of gloss after 6-months storage in an industrial atmosphere (gloss meter according to Lange, measuring angle 45°) | Drop from 80 to 60%. |

EXAMPLE 3

Coating powder (a) Production of a polyether: As described in Example 1 under (a).

(b) Production of a coating powder:

| Raw materials: | G. |
|---|---|
| Polyether described under (a) | 100 |
| Agent to form an adduct (an isocyanate was used as the agent, which was produced by reacting toluene diisocyanate and 4,4'-dihydroxydiphenyl propane in a molar ratio quantity) | 85 |
| Titanium dioxide as filler | 120 |

The polyether is melted on a heated two-roll mill at a roll temperature of 100–110° C., and is mixed with the filler. After the filler has been well wetted and distributed homogeneously, the agent for the formation of the adduct is added, and this is mixed at the same temperature for 1–2 minutes. Subsequently the mixture is immediately cooled, and the mixture at first is preground in a disk attrition mill, it being further comminuted afterwards in an impeller breaker. A screened grain fraction of 30–80μ is suitable for use as a coating powder and can be applied with the customary application device. The material is suitable both for operating with an electrostatic spray gun and in fluidized beds, as customary in whirl sintering.

(c) Production of the coating: To harden the powder to be applied to metallic surfaces, a baking time of 30 minutes at 180° C. is employed.

(d) Characteristics of the film:

| | |
|---|---|
| Film thickness | 80μ. |
| Development | Good. |
| Pendelhärte according to König | 195. |
| Erichsen depression | 6–7 mm. |
| Yellowing (Xeno test method), 500 hours | No noticeable change. |
| Chalking resistance, DIN 53159, 1 year (evaluation: chalking scale of the Titanium Company) | 10. |
| Reduction in gloss after 6-months storage in an industrial atmosphere | No noticeable change. |

In order to emphasize the difference between the coating powder based on the cycloaliphatic ethers according to this invention and the coating powders based on the aromatic ethers of the prior art, the following data were obtained using an epoxy resin powder sold commercially, which is based on bisphenol A-epoxy resins. The process is conducted according to the recommendations of the producers; i.e. the coating was cured for 10 minutes at 200° C.

Characteristics of the varnish film:

| | |
|---|---|
| Layer thickness | 80μ. |
| Development | Good. |
| Erichsen depression | 8–10 mm. |
| Pendelhärte according to König | 190–210. |
| Yellowing (Xeno test method) | Clearly visible. |
| Chalking resistance, DIN 53159, 1 year (evaluation according to the chalking scale of the Titanium Company) | 6–7. |
| Reduction in gloss after 6-months storage in an industrial atmosphere | Clear change. |

What is claimed is:

1. In a composition of matter comprising the reaction product of a polyether and a polyisocyanate, the improvement wherein the polyether has the formula:

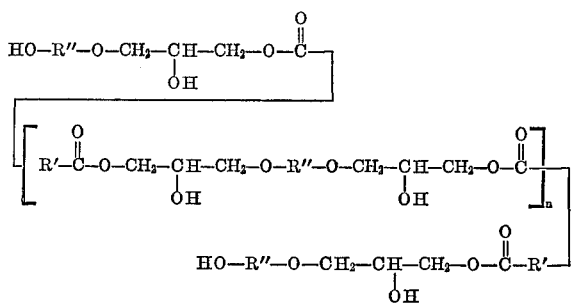

in which

R'=unsubstituted, halogen-substituted or alkyl substituted cyclohexylene ring,
R''=cyclohexylene, tricyclodecane-dimethylene or cyclohexanedimethylene, and
n=an integer from about 10 to about 40.

2. Composition of claim 1 in which the polyether is the reaction product of an unsubstituted, halogen-substituted or alkyl substituted hexahydrophthalic acid diglycidyl ester with a cycloaliphatic diol in a molar ratio of 1:0.8 to 0.8:1, the value of $n$ of the polyether being determined by the reaction of said ester with said diol.

3. Composition of claim 2 in which the ester is unsubstituted hexahydrophthalic acid diglycidyl ester.

4. Composition of claim 3 in which the diol is selected from the group consisting of 4,4'-dihydroxydicyclohexylpropane and tricyclodecanedimethylol.

5. Composition of claim 1 in which the polyisocyanate is tris-(isocyanatohexamethylene)-biuret.

6. A coating composition comprising as essential film-forming component the composition of claim 1.

7. A substrate having coated thereon the coating composition of claim 6.

8. A molded article comprised of the composition of claim 1.

References Cited

UNITED STATES PATENTS 3,010,940   11/1961   Charlton et al. ___ 260—77.5 AP

MAURICE J. WELSH, JR., Primary Examiner

U.S. Cl. X.R.

117—132 A, 132 B; 260—37 N, 75 NR